(12) United States Patent
Dreyer et al.

(10) Patent No.: US 11,495,972 B2
(45) Date of Patent: Nov. 8, 2022

(54) SELECTING SWITCHING TIMES OF WIND TURBINE CONVERTERS

(71) Applicants: Siemens Gamesa Renewable Energy A/S, Brande (DK); Siemens Gamesa Renewable Energy GmbH & Co. KG, Hamburg (DE)

(72) Inventors: Thomas Dreyer, Achim (DE); Robert Vernon Fulcher, Stoke on Trent (GB); Jerome Koenig, Hamburg (DE); Christoph Nentwig, Hamburg (DE)

(73) Assignees: SIEMENS GAMESA RENEWABLE ENERGY A/S; SIEMENS GAMESA RENEWABLE ENERGY GMBH & CO. KG

( * ) Notice: Subject to any disclaimer, the term of this patent is extended or adjusted under 35 U.S.C. 154(b) by 0 days.

(21) Appl. No.: 16/973,082

(22) PCT Filed: Jun. 11, 2019

(86) PCT No.: PCT/EP2019/065176
§ 371 (c)(1),
(2) Date: Dec. 8, 2020

(87) PCT Pub. No.: WO2019/238658
PCT Pub. Date: Dec. 19, 2019

(65) Prior Publication Data
US 2021/0249865 A1 Aug. 12, 2021

(30) Foreign Application Priority Data
Jun. 12, 2018 (EP) .................................... 18177345

(51) Int. Cl.
*H02J 3/38* (2006.01)
*H02J 3/01* (2006.01)
(Continued)

(52) U.S. Cl.
CPC .............. *H02J 3/381* (2013.01); *F03D 7/048* (2013.01); *H02J 3/01* (2013.01); *H02J 3/46* (2013.01);
(Continued)

(58) Field of Classification Search
CPC ... F03D 7/048; H02J 3/381; H02J 3/01; H02J 3/46; H02J 2300/28; F05B 2220/30;
(Continued)

(56) References Cited

U.S. PATENT DOCUMENTS

2008/0284252 A1* 11/2008 Jones ....................... H02J 3/40
  307/82
2016/0043651 A1* 2/2016 Fulcher ................... H02M 7/77
  290/44

FOREIGN PATENT DOCUMENTS

EP    1 995 863 A2    11/2008
EP    2 466 737 A2    6/2012
EP    2 482 418 A1    8/2012

OTHER PUBLICATIONS

European extended search report dated Nov. 23, 2018 for Application No. 18177345.8.
(Continued)

*Primary Examiner* — Joseph Ortega
(74) *Attorney, Agent, or Firm* — Schmeiser, Olsen & Watts LLP

(57) ABSTRACT

Provided is a method of controlling wind turbine converters of wind turbines parallel connected at a point of common coupling, the method including: generating for each converter within a same length of a pulse width modulation period a pulse, wherein the pulses start for different converters at different pulse start phases, wherein pulse start phase differences of the pulse start phases between at least two of adjacent converters are unequal.

14 Claims, 3 Drawing Sheets

Figure 3:
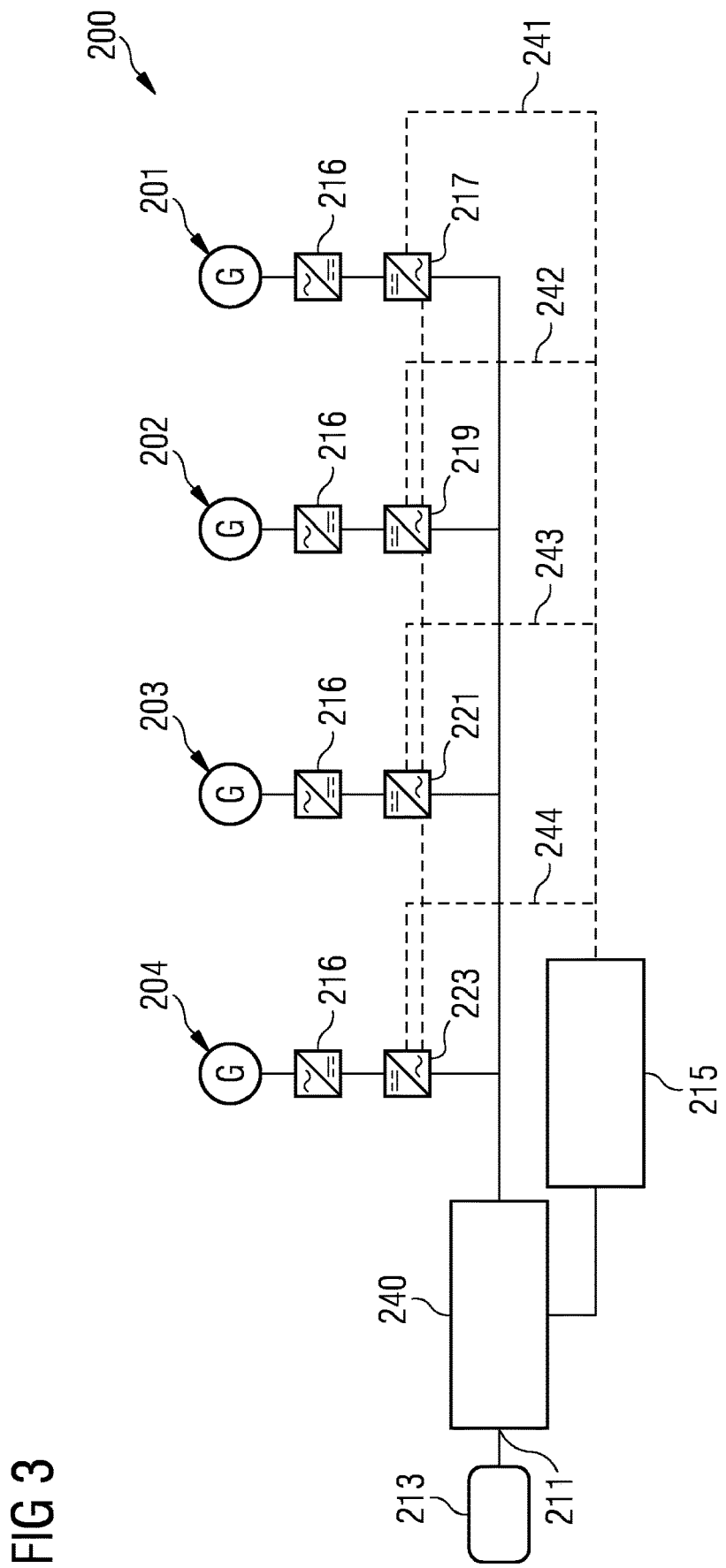

(51) Int. Cl.
*H02J 3/46* (2006.01)
*F03D 7/04* (2006.01)

(52) U.S. Cl.
CPC ....... *F05B 2220/30* (2013.01); *H02J 2300/28* (2020.01)

(58) Field of Classification Search
CPC .......... Y02E 40/40; Y02E 10/76; H02M 7/48; H02M 1/12
See application file for complete search history.

(56) References Cited

OTHER PUBLICATIONS

International Search Report & Written Opinion dated Sep. 13, 2019 for PCT/EP2019/065176.

* cited by examiner

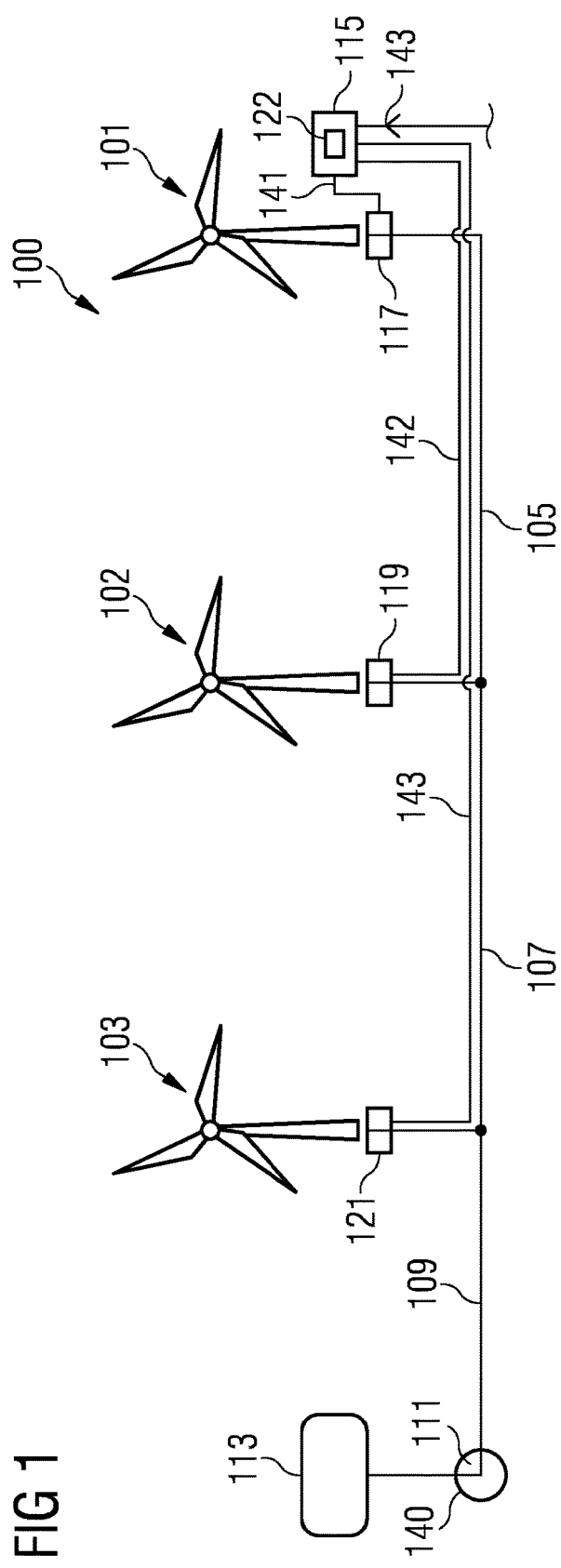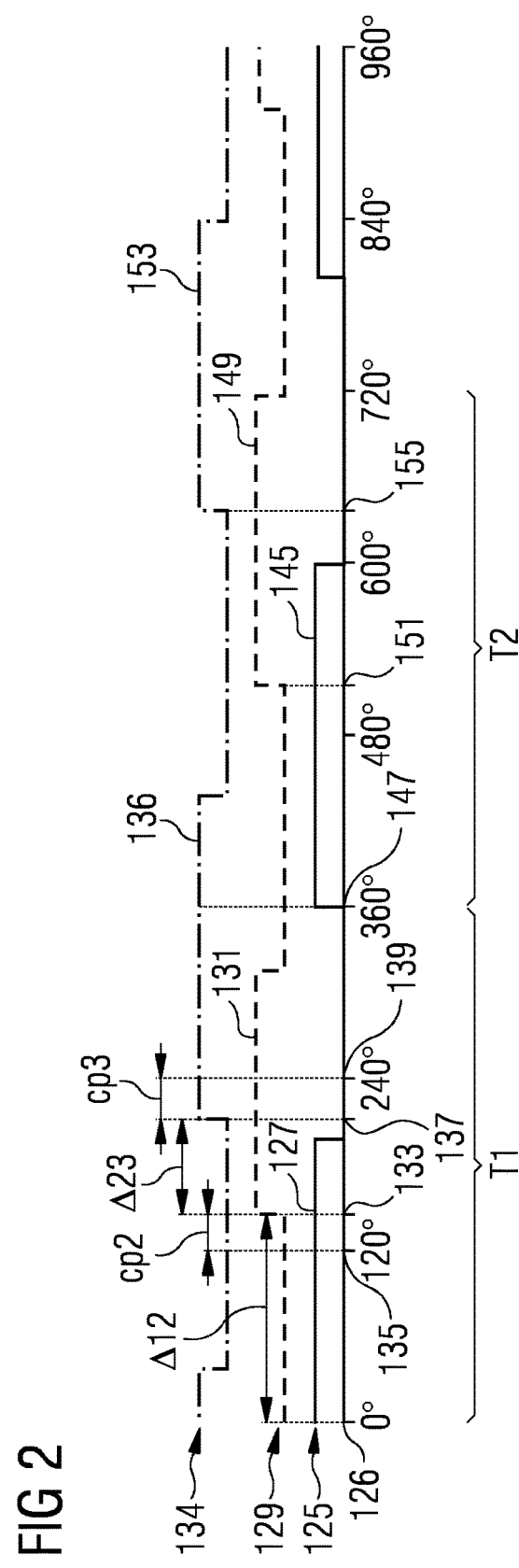

SELECTING SWITCHING TIMES OF WIND TURBINE CONVERTERS

CROSS-REFERENCE TO RELATED APPLICATIONS

This application claims priority to PCT Application No. PCT/EP2019/065176, having a filing date of Jun. 11, 2019, which is based on EP Application No. 18177345.8, having a filing date of Jun. 12, 2018, the entire contents both of which are hereby incorporated by reference.

FIELD OF TECHNOLOGY

The following relates to a method and an arrangement of controlling wind turbine converters of wind turbines parallel connected to a point of common coupling and further relates to a wind park comprising wind turbines and the control arrangement.

BACKGROUND

A wind park comprising plural wind turbines may comprise for each wind turbine a converter comprising plural controllable switches, such as transistors, isolated gate bipolar transistor (IGBT). The plural controllable switches are switched at high switching frequencies, for example according to a pulse width modulation methodology. Herein, the controllable switches may be switched according to a pulse width modulation frequency which may be for example 2.5 kHz. The converters are utilized for converting a variable frequency power stream provided by generators of the wind turbine to a substantially fixed frequency (for example 50 Hz or 60 Hz) power stream.

Due to the switching frequencies of the controllable switches within the converters, not only a desired output frequency, such as 50 Hz or 60 Hz, is observed at the point of common coupling, but also high frequency harmonic currents caused by converter systems with high switching frequencies are observed. However, grid codes of various countries, as for example in Germany, require low harmonic current levels at the point of common coupling fed into the grid by a grid farm. Measurements of electrical characteristics at the point of common coupling have revealed that peaks in harmonic currents are occurring on the switching frequency and multiples of the switching frequency. Depending on how low the limits of the grid codes are, it is likely that the requirements cannot be met by wind farms. In such a case, a grid operator may prohibit grid connection of the wind farm.

Conventionally, inter-turbine converter PWM (pulse width modulation) de-synchronisation has been proposed to mitigate harmonic current emissions at the point of common coupling by adjusting the angle between converter switchings in between turbines in a de-synchronisation cluster. The conventionally applied de-synchronisation method adds a fixed offset to each of the converters in a de-synchronisation loop based on turbine position and the number of turbines in a cluster. In theory, this de-synchronisation may cancel all harmonic currents caused by the converter switching at the point of common coupling. However, it has been observed that nevertheless there is considerable content of harmonics of the switching frequency present at the point of common coupling.

Thus, there may be a need for a method and a corresponding arrangement to reduce harmonic emissions on high frequencies and to allow for connection to grids with very low limits/thresholds.

SUMMARY

According to an embodiment of the present invention it is provided a method of controlling wind turbine converters of wind turbines parallel connected at a point of common coupling (e.g. of a wind park), the method comprising: generating for each converter within a same length of a pulse width modulation period a pulse, wherein the pulses start for different converters at different pulse start phases, wherein pulse start phase differences of the pulse start phases between at least two of adjacent converters are unequal.

The method may partly be implemented in hardware and/or software. The method may for example be carried out by a wind park controller and/or a wind turbine controller and/or a master wind turbine controller when utilized in a master slave arrangement. The wind turbines may for example be connected at a single strand (or in multiple strands) in parallel to the point of common coupling. Conventionally, a fixed phase angle offset between adjacent wind turbines has been applied, the phase angle offset being dependent on the number of the wind turbines in the branch or the strand.

According to an embodiment of the present invention, controllable switches within the converter are controlled by pulse width modulation signals having a same pulse width modulation frequency. The control method requires that at least one pulse is generated for each converter, and also supplied to the converter, supplied to one or more controllable switches within the converter. Additionally, for each converter, one or more further or next pulses may be generated and also supplied to the converter.

Adjacent converters are converters which are next to each other in the considered branch or strand connected to the point of common coupling. Conventionally, a fixed phase difference (of start points of pulses) between adjacent converters have been applied in a de-synchronisation method. According to this embodiment of the present invention, however, the start phase difference(s) of pulse start phases between at least two adjacent converters are different or unequal. Within one pulse width modulation period, at least or exactly one pulse may be present.

Exactly one pulse may be present within a pulse width modulation period. The pulse may start at the start of the entire pulse width modulation period. The pulse may be characterized for example by a shape, being rectangular, and a width, wherein the width is at most equal to the pulse width modulation period. The duty cycle may be defined as a fraction between the pulse width and the remaining duration of the pulse width modulation period, wherein the pulse is not present or where the pulse vanishes. The pulse may define a duration during which one or more of the controllable switches of the converter are turned on, thus being in a conducting state. The width of the pulse may depend on a desired electrical characteristics at the output terminal of the respective converter and may also depend on the desired electrical characteristics at the point of common coupling. The pulses for all converters may be adapted to achieve a sinusoidal power output oscillating for example with 50 Hz or 60 Hz at the point of common coupling.

When the pulses for different converters start at different pulse start phases, this corresponds to the situation that the pulses start for different converters at different pulse start times. A start phase may therefore be converted to a start time, for example by start time=start phase*T/360°, wherein T represents the pulse width modulation period. By the method, the different converters are de-synchronized, but not by a fixed phase shift, as has been conventionally applied. Thereby, harmonic content of multiples of the pulse modulation switching frequency may be reduced.

According to an embodiment of the present invention, the pulses start for different converters at different pulse start times, wherein pulse start time differences of the pulse start times between at least two of adjacent converters are unequal. Referring to pulse start time is an alternative to referring to pulse start phases.

According to an embodiment of the present invention, the whole pulse width modulation signal period starts for different converters at the different start phases or period start times.

Conveniently, a pulse width modulation signal period may have at its beginning the start of the pulse. In other embodiments, all pulse width modulation signal periods of all converters may be synchronized (e.g. start at a same point in time), but just the pulse may not start at the respective beginning of the pulse width modulation signal period, but may start later than the beginning of the pulse width modulation signal period.

According to an embodiment of the present invention, all pulse width modulation signal periods of all converters are synchronized, i.e. start at a same start point in time. Thus, the method is different from independently operating or controlling the controllable switches, wherein each converter arbitrarily has its own pulse width modulation signal period start time, being independent of all other pulse width modulation start times of all other converters.

According to an embodiment of the present invention, the pulse start phases are defined such that harmonic content of an electrical quantity at the point of common connection at or around one or more multiples of a pulse width modulation frequency is less than one or more thresholds, wherein the pulse width modulation frequency is between 2 kHz and 3 kHz.

The harmonic content may for example comprise for each multiple of the pulse width modulation switching frequency at least one sideband(s). The harmonic content may for example comprise oscillation in a range of 2 kHz to 9 kHz, for example at substantially 2.5 kHz, at 5.1 kHz and for example at 7.5 kHz and additionally having respective sidebands spaced apart by for example 200 Hz from the above-mentioned peaks. The method according to embodiments of the present invention may be capable of reducing one or more of these harmonic content oscillations. Grid codes may define thresholds for different frequencies. The pulse width start phases may be adjusted such that the respective harmonic content is below the respective thresholds.

According to an embodiment of the present invention, the pulse start phases are based on at least one feedback signal being indicative of at least one harmonics of the harmonic content of the electrical quantity at the point of common coupling, wherein the pulse start phases are continuously defined, and/or optimized, based on the feedback signal.

The feedback signal may for example be based on a measurement of an electrical quantity and/or a measurement of an acoustic quantity. A measuring at the point of common coupling of the harmonic content of an electrical quantity, such as voltage and/or current and/or power, may be performed. One or more frequency filters may be applied to the feedback signal. The feedback signal may continuously be acquired and continuously the pulse start phases may be adapted, and/or optimized based on the feedback signal. An optimization algorithm may be provided for this purpose. The optimization algorithm may receive as input signal further delay time related quantities as will be described below. The delay time based quantities may characterize for each converter (or each wind turbine) communication times, processing times, and/or supply times of the power.

According to an embodiment of the present invention, the pulse start phases are obtained as sums of preliminary pulse start phases and correction phases, wherein the preliminary pulse start phases for adjacent converters of N parallel connected converters have constant phase difference, such as 360°/N.

Conventionally, only the preliminary pulse start phases may have been applied in a de-synchronisation method. The correction phases as applied according to this embodiment of the present invention, however, allow to take into account additional parameters further influencing the harmonic content at the point of common coupling for the different converters and/or wind turbines.

According to an embodiment of the present invention, the correction phases for at least two different converters are different. The correction phases may be different from zero for all converters.

According to an embodiment of the present invention, the pulse start phase and/or the correction phase for a considered converter is based on: a length and/or an electrical characteristics, capacitance and/or inductance, of a power connection cable from the power output terminal of the considered converter to the point of common coupling, and/or a propagation time of the power in a power connection cable from the power output terminal of the considered converter to the point of common coupling; a communication time between a converter controller and the considered converter; and/or a communication cable length and/or communication fibre length between a converter controller and the considered converter; and/or a delay time due to operation duration of the considered converter; and/or trial and error.

The length and the electrical characteristics of the power connection cable may define the propagation time of the power from the output terminal of the considered converter to the point of common coupling. Depending on the propagation time, a phase of the oscillation of harmonics will be observed at the point of common coupling. Thus, taking into account the propagation time of the power may allow to adjust the respective pulse start phase such as not to constructively interfere with a similar harmonic content generated by another converter, but do considerably lead to destructive interference.

Furthermore, the communication time may additionally or alternatively be considered for appropriately adjusting the pulse start phases. Thereby, the communication cable length and/or the communication fibre length may define, together with propagation characteristics of the cable and/or the fibre, the communication time.

Furthermore, the different converters may require different processing times or operation times or may comprise operation delay. Taking into account one or more of these time shifts introduced by the communication and/or transmission of power and/or processing may enable to appropriately adjust the pulse start phases for all the converters in order to reduce the harmonic content which is undesired.

According to an embodiment of the present invention, a correction phase difference of correction phases for a first considered converter and a second considered converter is based on: a propagation time difference between a first power propagation time of power from the first considered converter to the point of common coupling and a second power propagation time of power from the second considered converter to the point of common coupling; and/or a communication time difference between a first communication time of communication between a converter controller and the first considered converter and a second communication time of communication between the converter controller and the second considered converter; and/or a delay time difference between a first delay time due to operation duration of the first considered converter and a second delay time due to operation duration of the second considered converter; and/or trial and error.

The inventors have observed that not the absolute value of the correction phase, but the difference of correction phases of a first considered and a second considered converter may be relevant for defining or controlling the converters. Thereby, the method may further be simplified.

The propagation time difference and/or the communication time difference and/or the delay time difference may be considered separately or in combination for defining the correction phase difference and thus the correction phases of the first and the second considered converter.

According to an embodiment of the present invention, the converters are controlled in a master and slave arrangement, wherein the master transmits a synchronisation signal to all slaves, wherein the communication time (as considered above) is the time required for the synchronisation signal to travel from the master to the slave.

The master may be considered as a master controller or a master converter or a master wind turbine. The master wind turbine may transmit a de-synchronisation signal regarding de-synchronisation of the pulse start phases (or times) of all converters or all wind turbines. The communication time mentioned above may be the time duration required for the de-synchronisation signal to travel from the master (for example wind turbine) to the slave (for example wind turbine).

The master wind turbine may transmit a synchronisation signal regarding synchronisation of the pulse width modulation periods such that the pulse width modulation periods start at a same time point for all converters or all wind turbines.

According to an embodiment of the present invention, the method further comprises generating for each converter within at least one next pulse width modulation period a next pulse, wherein the next pulse starts for different converters at different next pulse start phases differences of the next pulse start phases between adjacent converters are unequal, wherein at least one of the next pulse start phases of a considered converter is different from the pulse start phase of the considered converter.

Plural next pulses may be generated in plural next pulse width modulation periods which are temporarily arranged successively. Due to changes in communication delay and/or communication time and/or propagation times of power propagation the next pulse start phase may be different from the (previous) pulse start phase. Thus, continuously adjusting the respective pulse start phases may effectively reduce undesired harmonic content at the point of common coupling.

According to an embodiment of the present invention, the pulses for same or different electrical phases for different converters have essentially same width, depending on a desired characteristic of electrical output.

The different converters may all contribute to establish electrical output at the point of common coupling having a desired frequency, desired voltage and desired current. Thus, the different converters may essentially be controlled in a similar manner.

Methods according to embodiments of the present invention may control grid side portions of the converters, i.e. DC-AC portions of wind turbine converters. A generator side portion (AC-DC portion of the respective converters may be unaffected by the control method.

According to an embodiment of the present invention, the method further comprises supplying, to the respective converter, the pulse, as a gate signal to a gate of at least one controllable switch, IGBT, of the converter.

The pulse may be different for different phases of the output stream of the converters. Thus, to different controllable switches (associated with different electrical phases) within one converter different pulse width modulation signals may be sent, wherein for example the pulses are offset by 120°. The converters may for example output electrical power provided in three phases, for example an A, a B and a C phase at three output terminals. The A phase output by all the converters may be generated by pulses having essentially a same width and respective pulse start times or start phases being defined as explained above.

It should be understood, that features, individually or in any combination, disclosed, described or applied to a method of controlling wind turbine converters of wind turbines parallel connected to a point of common coupling may also be applied, individually or in any combination, to an arrangement for controlling the turbine converters according to embodiments of the present invention and vice versa.

According to an embodiment of the present invention it is provided an arrangement for controlling wind turbine converters of wind turbines parallel connected at a point of common coupling (e.g. of a wind park), the arrangement comprising: a module adapted to generate for each converter within a same length of a pulse width modulation period a pulse, wherein the pulses start for different converters at different pulse start phases, wherein pulse start phase differences of the pulse start phases between adjacent converters are unequal.

The module may be part of a wind park controller and/or a part of a wind turbine controller.

Furthermore, a wind park is provided which comprises plural wind turbines each having a wind turbine converter and an arrangement according to one of the above described embodiments. The arrangement may be configured to carry out a method of controlling wind turbine converters according to an embodiment of the present invention.

BRIEF DESCRIPTION

Figure 4:
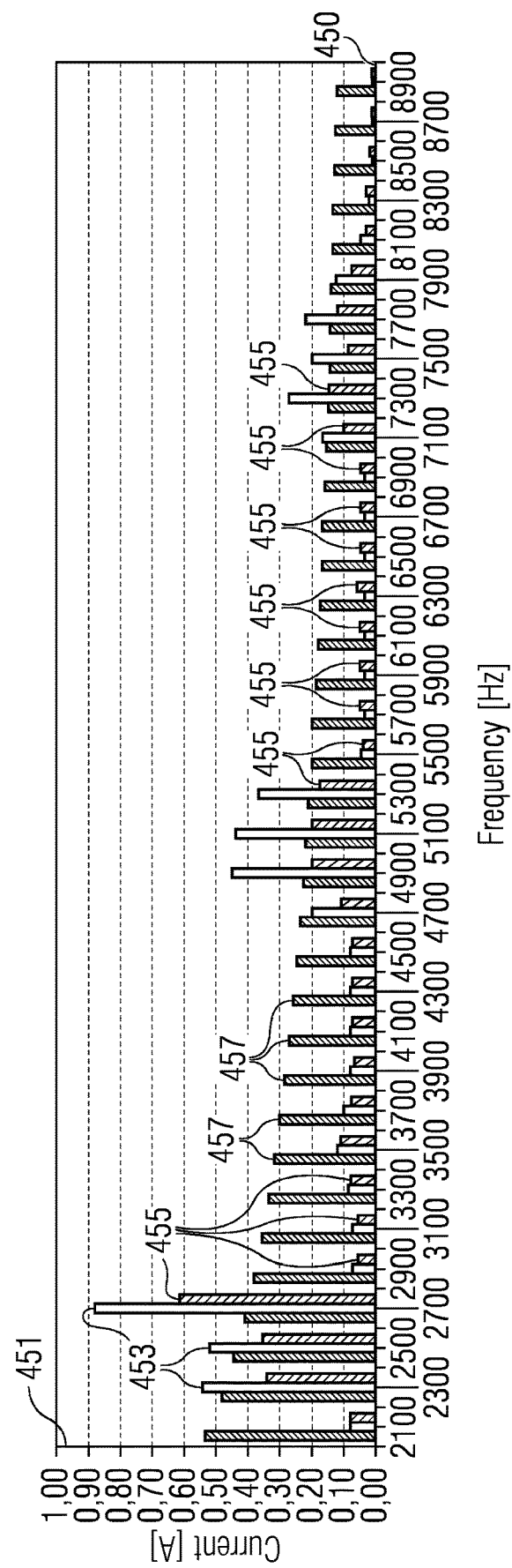

Some of the embodiments will be described in detail, with references to the following Figures, wherein like designations denote like members, wherein:

FIG. 1 schematically illustrates a wind park according to an embodiment of the present invention;

FIG. 2 illustrates pulse width modulation signals as derived and applied according to an embodiment of the present invention;

FIG. 3 schematically illustrates a wind park according to another embodiment of the present invention; and FIG. 4 illustrates results as obtained when applying a method according to an embodiment of the present invention.

DETAILED DESCRIPTION

The illustration in the drawings is in schematic form. It is noted that in different figures, similar or identical elements are provided with the same reference signs or with reference signs, which are different from the corresponding reference signs only within the first digit.

The wind park 100 schematically illustrated in FIG. 1 comprises plural wind turbines 101, 102 and 103 which are connected via connection cables or a strand of a connection cable 105, 107, 109 in a parallel manner to a point of common coupling 111 which is connected to a utility grid 113. Optional transformers are not indicated in FIG. 1.

The wind park further comprises an arrangement 115 for controlling wind turbine converters 117, 119, 121 of the wind turbines 101, 102, 103, respectively, according to an embodiment of the present invention. In the illustrated embodiment, the arrangement 115 is part of the wind turbine 101 which is configured as a master wind turbine. The arrangement 115 comprises a module 122 which is adapted to generate for each converter 117, 119, 121 within a same length T of a pulse width modulation period a pulse (PWM signals 125, 129, 134 illustrated in FIG. 2), wherein the pulses start for different converters at different pulse start phases, wherein pulse start phase differences of the pulse start phases between adjacent converters are unequal.

FIG. 2 illustrates pulse width modulation signals 134, 129, 125 from top to bottom supplied to the converters 121 of the wind turbine 103, the converter 119 of wind turbine 102 and the converter 117 of wind turbine 101, respectively. For the master wind turbine 101 and its converter 117, the pulse width modulation signals 125 comprise within a first pulse width modulation period T1 a pulse 127 which starts at the beginning 126 of the first pulse width modulation period T1. The pulse width modulation signals 129 for the wind turbine 102 and its converter 119 comprise a pulse 131 which start at a pulse start phase 133 which is at around 140°. Thus, the pulse start phase 133 is different from a conventionally applied preliminary pulse start phase 135 which is derived by dividing 360° by N, wherein N=3 corresponding to the number of wind turbines in parallel connected to the point of common coupling at a same strand 105, 107, 109. The actual pulse start phase 133 deviates by a correction phase cp2 from the preliminary pulse start phase 135.

The pulse width modulation signals 134 for the third wind turbine 103 and its converter 121 comprise a pulse 136 which starts at a pulse start phase 137 which is about 200°. The pulse start phase 137 is different from (smaller than) a preliminary pulse start phase 139 which has conventionally been applied to be 240°. The pulse start phase 137 is by a correction phase cp3 different from the preliminary pulse start phase 139.

The arrangement receives from a measuring device 140 a measurement signal 143 which is indicative of the harmonic content of an electrical quantity, such as voltage at the point of common coupling 111. Based on this feedback signal 143 and based on further information regarding the configuration of the wind park 100, the arrangement 115 derives or generates for each converter 117, 119, 121 the respective pulse width modulation signals 125, 129, 134 for the different converters 117, 119, 121, respectively, comprising the pulses 127, 131, 136, respectively, starting at different pulse start phases or pulse start times.

For defining the respective pulse start phases 126, 133, 137, the arrangement 115 may also take into account a length and/or an electrical characteristics of a power connection cable from the power output terminal of the respective converter to the point of common coupling 111. For the master wind turbine 101, the length of the power cable sections 105, 107, 109 and the electrical characteristics of all these cable portions may be considered. For the second wind turbine 102 and its respective converter 119 for example, the length of the power connection cables 107 and 109 may be considered. For the third wind turbine 103, for example the length of the power connection cable 109 may be considered.

Additionally or alternatively, respective propagation time of power flow from the respective converters to the point of common coupling 101 may be separately or in combination considered for defining the pulse start phases and/or the correction phases for the converters.

Furthermore, the arrangement 115 communicates via communication cables or fibres 141, 142 and 143 to the wind turbines 101, 102 and 103, respectively. The communication times for communicating between the arrangement 115 and the respective converters may also be taken into account for defining the pulse start phases and/or the correction phases. Instead of taking into account the communication time, also the communication cable length or fibre length between the converters and the respective arrangement 115 may be taken into account.

Furthermore, the converters 117, 119, 121 may require different processing or operation time for, after receiving the control signals regarding the start times, effectively establish the control signals at the respective gates of controllable switches. Also, this delay time due to operation duration of the considered converter may be taken into account for definition of the pulse start phases and/or the correction phases.

In other embodiments, only a propagation time difference between a first power propagation time of power from the first considered converter to the point of common coupling and a second power propagation time of power from the second considered converter to the point of common coupling may be taken into account, optionally together with other parameters. For example, the difference in propagation time of power propagation from the respective converter to the point of common coupling 111 may be, for the first wind turbine 101 and the second wind turbine 102 only the propagation time required for propagating the connection cable portion 105 between the first turbine 101 and the second turbine 102.

Furthermore, instead of considering absolute communication times, also additionally or alternatively communication time differences may be considered for defining the pulse start phases and/or correction phases. Furthermore, instead of considering the absolute delay times due to operating duration or processing duration of the respective converter, respective delay time differences may be considered.

The wind park 100 comprises a control system wherein the converters are controlled in a master and slave arrangement, wherein the master 101 (or arrangement 115) transmits a de-synchronisation signal to all slaves 102, 103 including their converters 119, 121, respectively.

Thereby, the communication time is the time required for the synchronisation signal to travel from the master to the respective slave. The pulses themselves may, timed according to the de-synchronisation signal, be generated by the converters (or converter controllers), instead of by the arrangement 115.

For the pulses 127, 131, 136, the pulse start phase difference D12 between the pulse start phase 126 of the pulse 127 and the pulse start phase 133 of the pulse 131 is different from the pulse start phase difference D23 between the pulse start phase 133 of the pulse 131 and the pulse start phase 137 of the pulse 136 of the adjacent wind turbines 102 and 103.

After the first pulse width modulation period T1 has elapsed, a second pulse width modulation period T2 succeeds in which the pulse width modulation signals 125, 129, 134 continue. For the first wind turbine or master wind turbine 101 and its respective converter 117, a next pulse 145 is generated and transmitted which starts at a next pulse start phase 147. Similarly, the second pulse width modulation signals 129 comprise within the second pulse width modulation period T2 a next pulse 149 which starts at a next pulse start time 151. Furthermore, the third pulse width modulation signals 134 comprise in the second pulse width modulation period T2 a next pulse 153 which starts at a next pulse start phase 155. Also, respective differences of the next pulse start phases between adjacent converters are unequal.

Elements or features in the FIGS. 1 and 3 which are similar in structure and/or function are labelled with reference signs differing only in the first digit.

FIG. 3 schematically illustrates a wind park 200 according to another embodiment of the present invention. The wind turbine generators 201, 202, 203, 204 are connected to respective generator side converter portions 216 which may not be controlled according to embodiments of the present invention. The generator side portions of the converters 216 are connected, via an optional DC-link, to respective grid side converter portions 217, 219, 221 and 223.

The measurement system 240 measures the electrical characteristics at the point of common coupling 211 (which is connected to a utility grid 213) and supplies the measurement signals to the arrangement 215 for controlling the wind park 200. Via the control lines 241, 242, 243, 244, the arrangement 215 controls the respective converters, such as grid side converter portions 217, 219, 221, 223 such as supplying to them at least correction phases which may continuously be updated and which may be summed together with preliminary pulse start phases to arrive at the pulse start phases to be applied to generate the pulse width modulation signals.

In the embodiment illustrated in FIG. 3, the arrangement 215 comprises a pulse width modulation offset optimization algorithm, to optimize the correction phases. Thereby, according to embodiments of the present invention, inter-turbine converter pulse width modulation de-synchronisation may successively mitigate harmonic current emission at the point of common coupling by adjusting the angle (correction phase) between converter switching in between turbines in a de-synchronisation cluster. According to an embodiment of the present invention, a de-synchronisation algorithm may add a fixed offset to each of the converters in a de-synchronisation loop based on turbine position and the amount of turbines in the cluster. Furthermore, delays added by the system/wind farm are considered and further turbine/converter communication time delays and delays caused by the de-synchronisation algorithm itself may be considered individually or in any combination.

The preliminary pulse start phase may be derived simply by the number of turbines n in one de-synchronisation cluster, for example the preliminary pulse start phase is set to 360/N*cluster position. The fibre communication time or cable communication time of control signals may be highly side dependent. An automatic measurement of harmonics (current and/or voltage) including a feedback loop may output adjusted PWM offset parameters resulting in an optimized mitigation of harmonics at the point of common coupling.

According to an embodiment of the present invention, a control method may be based on a de-synchronisation through PWM offset between converters but may in addition adjust this parameter automatically with methods A and B sketched below.

A A continuous optimization according to measurements of harmonic emissions can be applied, reflecting the influence of the wind farm environment on de-synchronisation.

B A one-time parameter optimization depending on side conditions might be sufficient to reduce harmonics on a long-term basis.

The correction phase (also referred to as PWM offset) may be automatically adjusted continuously or one time according to a measurement feedback loop. By applying methods according to embodiments of the present invention, grid requirements may be met. Furthermore, additional filters may be dispensed with.

The wind park 200 illustrated in FIG. 3 illustrates the feedback loop which measures harmonics at the point of common coupling and feeds back an optimized PWM delay to the converter controller. This delay is added to the fixed de-synchronisation delay based on theoretical harmonic cancellation between turbines determined by the number of turbines in a de-synchronisation loop. The added delay (also referred to as correction phase or correction time) may compensate for the propagation time and the power cables, the inter-converter controller communication delay and any delays occurring through the converter module.

First, the harmonic current at the point of common coupling 211 may be measured. This could be done by a measurement system 240. Measurement may focus on the higher frequency harmonics from 2 kHz to 9 kHz. A PWM offset optimization algorithm 215 may adjust the additional PWM delay (i.e. the correction phase) for each turbine and may send it to the individual converter controller, iterating through optimization, as long as the harmonic emission does not reach static low values.

FIG. 4 shows a plot to show influence of different delay parameter sets. FIG. 4 shows on an abscissa 450 the frequency and on ordinate 451 the strength of a harmonics. The bars 453 indicate the harmonic content according to a first parameter set, the bars 455 denote the harmonic contents according to a second parameter set as derived according to embodiments of the present invention and the bars 457 indicate the thresholds as demanded by grid codes. It is observed that the second parameter set (bars 455) are below the harmonic contents as derived using the first parameter set (bars 453) and almost for all frequencies are below the thresholds (bars 457). Thus, different delay parameters can positively impact the level of harmonic currents at the point of common coupling.

As a first approximation for the pulse with modulation offset (or correction phase), delays caused by the fibre optic communication between turbine converters and the delays added by the overall high voltage cable length from each turbine up to the point of common coupling may contribute.

Fibre optic communication delays may be approximated by the distance of the communication line and the speed of communication according to:

$$T_{fibre} = \frac{l_{fibre}}{c} = \frac{l_{fibre}}{c} \times n = \frac{l_{fibre}}{3 \cdot 10^8 \frac{m}{s}} \times 1.5$$

c=speed of light
n=refractive index
$l_{fibre}$=length (fibre optic cable between turbine controllers)

The high voltage cable delays may be approximated as follows:

$$T_{cable} = \frac{l_{cable}}{VF} = \frac{l_{cable}}{c \times \sqrt{LC}}$$

$$T_{cable} = \frac{l_{cable}}{VF} = \frac{l_{cable}}{c \times \sqrt{LC}}$$

$l_{cable}$=length (power cable of two adjacent turbines)
L=inductance per unit length
C=capacitance per unit length The starting parameters for a continuous adjustment of the offset parameter may then be the pulse width modulation delay given by the de-synchronisation (also referred to as preliminary pulse start phase) plus the successively added calculated offset (also referred to as correction phase) between turbines. By feeding the measurement of the harmonic content into an optimization algorithm, indicating if changes in parameters resulted in an improvement of harmonic emissions, results can continuously be improved. A continuous feedback loop could include slight changes of fixed parameters like the refractive index or cable parameters.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of controlling wind turbine converters of plural wind turbines parallel connected at a point of common coupling, each of the plural wind turbines having a wind turbine converter, the method comprising:
generating a plurality of pulses, wherein each respective pulse of the plurality of pulses is for a respective converter and is within a same length of a pulse width modulation period,
wherein respective pulses of the plurality of pulses start for respective converters at respective pulse start phases, wherein pulse start phase differences of pulse start phases between at least two adjacent converters are unequal,
wherein the pulse start phases are obtained as sums of preliminary pulse start phases and correction phases,
wherein the preliminary pulse start phases for adjacent converters of N parallel connected converters have a constant phase difference of 360°/N,
wherein the correction phases are automatically adjusted continuously or one time according to a measurement feedback loop which measures harmonics at the point of common coupling, and
wherein respective correction phases of the adjacent converters are unequal.

2. The method according to claim 1, wherein the pulses start for different converters at different pulse start times, wherein pulse start time differences of the pulse start times between at least two of adjacent converters are unequal.

3. The method according to claim 1, wherein the whole pulse width modulation signal period starts for different converters at the different start phases or period start times or start at a same time point.

4. The method according to claim 1, wherein the pulse start phases are defined such that harmonic content of an electrical quantity at the point of common connection at or around one or more multiples of a pulse width modulation frequency is less than one or more thresholds,
wherein the pulse width modulation frequency is between 2 kHz and 3 kHz.

5. The method according to claim 1, wherein the pulse start phases are based on at least one feedback signal being indicative of at least one harmonics of the harmonic content of the electrical quantity at the point of common coupling,
wherein the pulse start phases are at least one of continuously defined, and optimized, based on the feedback signal.

6. The method according to claim 1, wherein the correction phases for at least two different converters are different.

7. The method according to claim 1, wherein at least one of the pulse start phase and the correction phase for a considered converter is based on at least one of:
at least one of a length and an electrical characteristics, at least one of capacitance and inductance, of a power connection cable from the power output terminal of the considered converter to the point of common coupling; and
a propagation time of the power in a power connection cable from the power output terminal of the considered converter to the point of common coupling; and
a communication time between a converter controller and the considered converter; and
a communication cable length and/or communication fibre length between a converter controller and the considered converter; and
a delay time due to operation duration of the considered converter; and
trial and error.

8. The method according to claim 1, wherein a correction phase difference of correction phases for a first considered converter and a second considered converter is based on at least one of:
a propagation time difference between a first power propagation time of power from the first considered converter to the point of common coupling and a second power propagation time of power from the second considered converter to the point of common coupling; and
a communication time difference between a first communication time of communication between a converter controller and the first considered converter and a second communication time of communication between the converter controller and the second considered converter; and
a delay time difference between a first delay time due to operation duration of the first considered converter and a second delay time due to operation duration of the second considered converter; and
trial and error.

9. The method according to claim 1, wherein the converters are controlled in a master and slave arrangement, wherein the master transmits a synchronisation signal to all slaves, wherein the communication time is the time required for the synchronisation signal to travel from the master to the slave.

10. The method according to claim 1, further comprising:
generating for each converter within at least one next pulse width modulation period a next pulse,
wherein the next pulse starts for different converters at different next pulse start phases differences of the next pulse start phases between adjacent converters are unequal,
wherein at least one of the next pulse start phases of a considered converter is different from the pulse start phase of the considered converter.

11. The method according to claim 1, wherein the pulses for same or different electrical phases different converters have essentially same width, depending on a desired characteristic of electrical output.

12. The method according to claim 1, further comprising:
supplying, to the respective converter, the pulse as a gate signal to a gate of at least one controllable switch, wherein the controllable switch is an isolated gate bipolar transistor (IGBT), of the converter.

13. An arrangement for controlling wind turbine converters of plural wind turbines parallel connected at a point of common coupling, each of the plural wind turbines having a wind turbine converter, the arrangement comprising:

a module adapted to generate a plurality of pulses, wherein each respective pulse of the plurality of pulses is for a respective converter and is within a same length of a pulse width modulation period,
wherein respective pulses of the plurality of pulses start for respective converters at respective pulse start phases, wherein pulse start phase differences of pulse start phases between adjacent converters are unequal,
wherein the pulse start phases are obtained as sums of preliminary pulse start phases and correction phases,
wherein the preliminary pulse start phases for adjacent converters of N parallel connected converters have a constant phase difference of 360° /N,
wherein the correction phases are automatically adjusted continuously or one time according to a measurement feedback loop which measures harmonics at the point of common coupling, and
wherein respective correction phases of the adjacent converters are unequal.

14. A wind park, comprising:
plural wind turbines each having a wind turbine converter; and
the arrangement according to claim 13.

* * * * *